Figure 1:
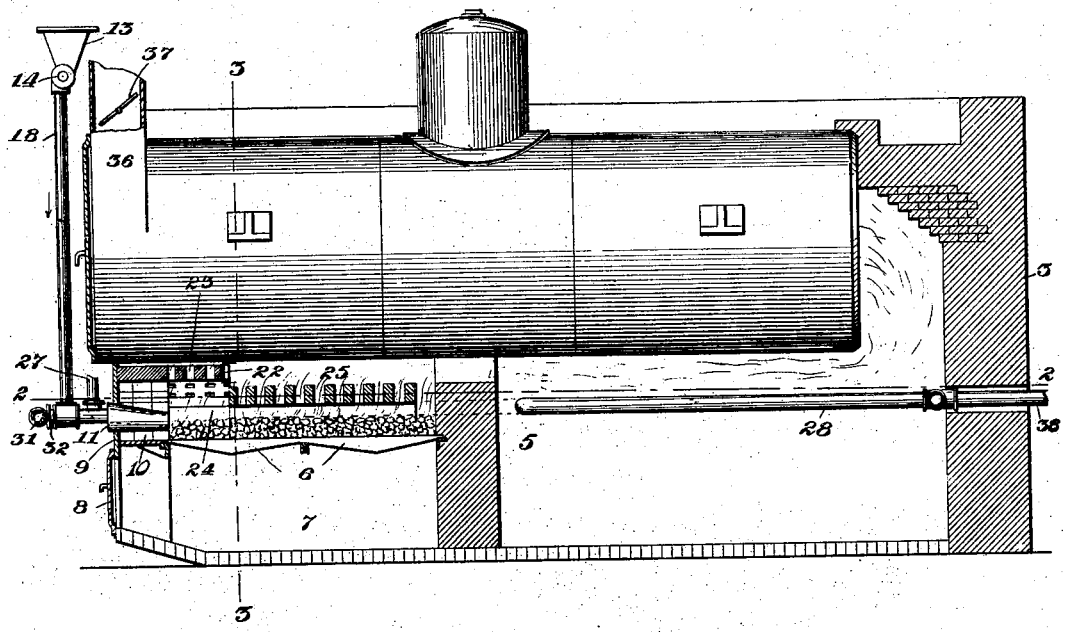

No. 739,040. PATENTED SEPT. 15, 1903.
W. W. WEAVER.
METHOD OF SUPPLYING FURNACES WITH FUEL AND PROMOTING COMBUSTION THEREOF.
APPLICATION FILED JAN. 20, 1903. RENEWED AUG. 12, 1903.

NO MODEL. 3 SHEETS—SHEET 1.

Witnesses:
Geo. E. Gauitt
Alex Scott

Inventor:
William W. Weaver
By Elliott & Hopkins
Attorneys

No. 739,040. PATENTED SEPT. 15, 1903.
W. W. WEAVER.
METHOD OF SUPPLYING FURNACES WITH FUEL AND PROMOTING COMBUSTION THEREOF.
APPLICATION FILED JAN. 20, 1903. RENEWED AUG. 12, 1903.
NO MODEL. 3 SHEETS—SHEET 2.

Witnesses:

Inventor:
William W. Weaver
By Elliott & Hopkins
Attys.

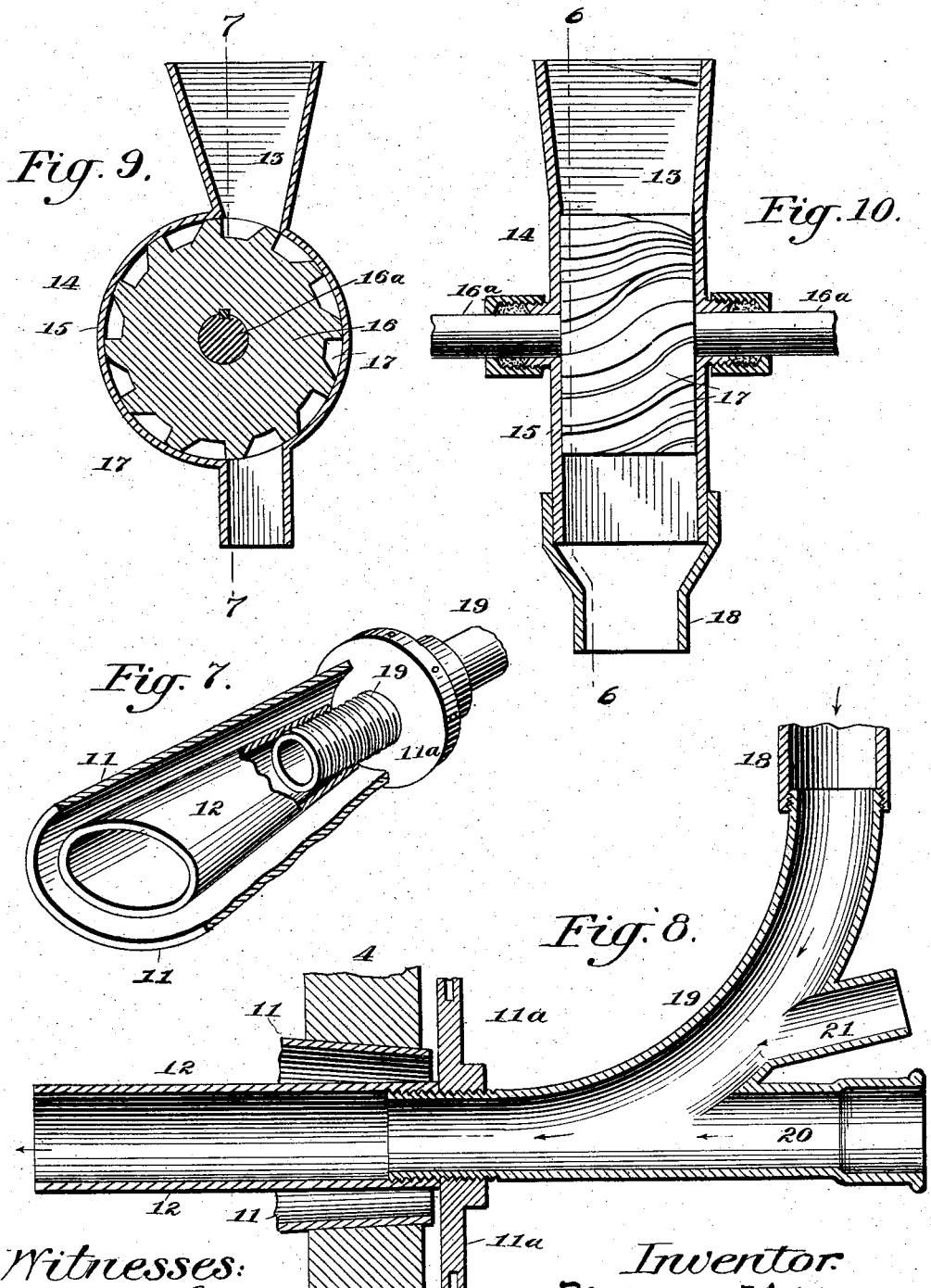

No. 739,040. Patented September 15, 1903.

UNITED STATES PATENT OFFICE.

WILLIAM W. WEAVER, OF CHICAGO, ILLINOIS, ASSIGNOR TO THE HOT BLAST SMOKELESS STOKER COMPANY, A CORPORATION OF ARIZONA TERRITORY.

METHOD OF SUPPLYING FURNACES WITH FUEL AND PROMOTING COMBUSTION THEREOF.

SPECIFICATION forming part of Letters Patent No. 739,040, dated September 15, 1903.

Application filed January 20, 1903. Renewed August 12, 1903. Serial No. 169,235. (No specimens.)

*To all whom it may concern:*

Be it known that I, WILLIAM W. WEAVER, a citizen of the United States, residing in the city of Chicago, county of Cook, and State of Illinois, have invented certain new and useful Improvements in Methods of Supplying Furnaces with Fuel and Promoting the Combustion Thereof, of which the following is a full, clear, and exact specification.

This invention relates particularly to the feeding of pulverized fuel to furnaces and promoting the combustion thereof.

One of the objects of my invention is to supply pulverized fuel to a furnace in such a manner that a substantial portion of the gases thereof will be evolved and combined with a supporter of combustion containing oxygen, but preferably air, in such proportions before ignition takes place that when ignited the combustion thereof shall be instantaneous and productive in the fire-chamber of a furnace of a degree and area of heat burning the finer particles of coal and coking the coarser particles thereof and that the coarser particles shall fall by gravity in a spread-out condition upon the grate-bars, so as to form an incandescent bed of fuel thereon, promoting the ignition of the gases evolved therefrom and insuring the perfect consumption of the coke on the grate-bars.

A further object is to supply to the fuel and gases prior to their ignition a supporter of combustion dry to a degree, preventing the solid fuel, coked or otherwise, from adhering to any of the walls of the inlet-passages therefor or the walls of the flame-passages or brick structure in the furnace, and thereby clogging or choking any of said passages or coating said walls.

A further object is to supply heat to the fuel of a degree releasing the gases therefrom in an unignited condition and have said heat derived from the furnace, but exterior of the fire-chamber, and then discharging said gases and a supporter of combustion therefor into an igniting degree of heat in the fire-chamber in such a manner as to insure the coking of the coarser particles of solid fuel in suspension and subsequently depositing said coked fuel upon the grate-bar surface of the fire-chamber.

A further object is to gradually expand the released gases before ignition takes place, combine therewith a supporter of combustion during such expansion, and deliver the fuel and said gases in an ignited spread-out condition throughout the fire-chamber and over the grate-bar surface thereof, and thereby correspondingly diffuse the heat of their combustion uniformly throughout the furnace and the boiler-setting or other surface to be heated.

A still further object is to evolve a sufficient percentage of the gases contained in the fuel to produce when ignited instantaneous combustion thereof in volume and degree insuring a degree of heat igniting within the fire-chamber gases otherwise unignitable and at the same time insuring the entire consumption of the solid fuel upon the grate-bars.

Another object is to discharge the unignited gases and fuel into an igniting degree of heat in a fire-chamber and carry their ignited products of combustion forward on a line substantially with the line of the draft of the furnace.

A still further object is to discharge the unignited gases and the fuel, together with a supporter of combustion therefor, into an igniting degree of heat in the fire-chamber of a furnace at such a low pressure as to prevent the piling up of the fuel against or passing over the bridge-wall and which at the same time permits the heavier particles of solid fuel to coke in space and fall by gravity upon the grate-bars in substantially uniform depth throughout the area thereof, so as to form a bed of incandescent fuel promoting the combustion of gases and the consumption of finer coal passing over it.

Another object is to maintain the ignited gases at whatever pressure they may be at so low a velocity during their passage throughout a furnace and over the surface to be heated as not only to enable complete combustion to take place in the fire-chamber, but to hold the ignited products in contact with the surface to be heated for the greatest possible length of time consistent with their necessary subsequent discharge from the furnace.

Another object is to supply the fuel, and particularly the unignited gases thereof, uniformly continuous to an igniting degree of heat in the fire-chamber, and thereby maintain continuously the degree of heat necessary to ignite all of the fuel-gases and consume the lighter particles of solid fuel.

The object of my invention, in other words, may be stated to be to liberate from the fuel the volatile and combustible gases prior to the introduction of the fuel and these liberated gases into a furnace, or, more accurately speaking, prior to combustion, and thereafter to ignite these gases and the solid particles or ingredients of the fuel in the presence of each other and a supporter of combustion containing oxygen (preferably atmospheric air) and in a state of agitation whereby instantaneous combustion of the combustible products of the fuel takes place and a fire of intense heat free from smoke is produced; furthermore, to supply the fire-chamber of a furnace with a continuous supply of fuel and at the same time keep the store of fuel from which such supply is drawn permanently cut off from the stoking-inlet, whereby the amount passing into the furnace or combustion-chamber may be and is gaged and regulated to a nicety and without the possibility of a surplus of fuel or an irregular supply of fuel being discharged into such fire-chamber and whereby a supporter of combustion may be employed, of which oxygen and atmospheric air are examples, for forcing the fuel, together with its unignited gases, into the fire-chamber in a line substantially with that of the draft of the furnace.

With these ends in view my invention consists in certain features of novelty hereinafter described in connection with the accompanying drawings, illustrating a means by which the said objects and certain other objects hereinafter appearing may be attained.

Figure 2:
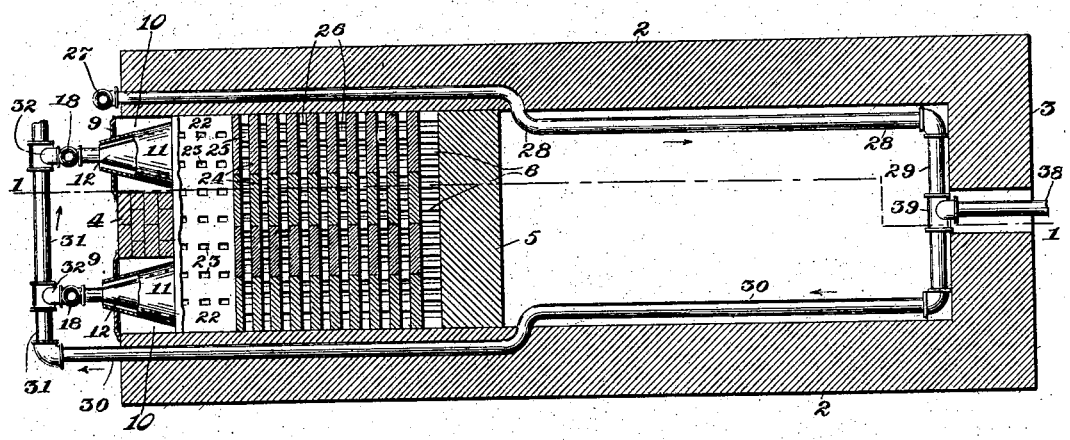
Figure 3:
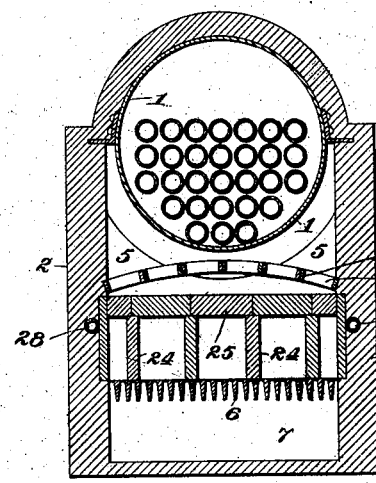
Figure 4:
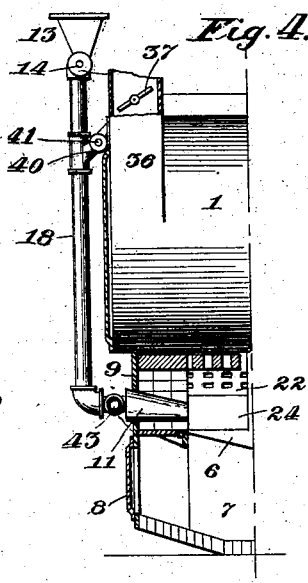
Figure 5:
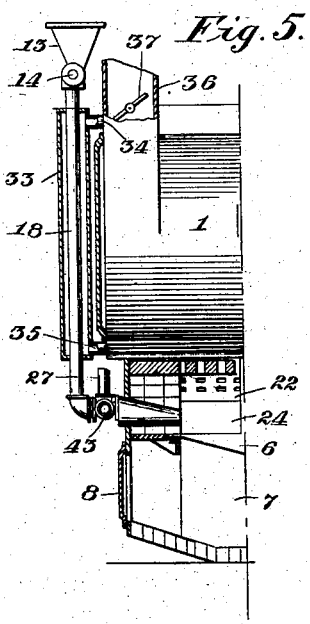
Figure 6:
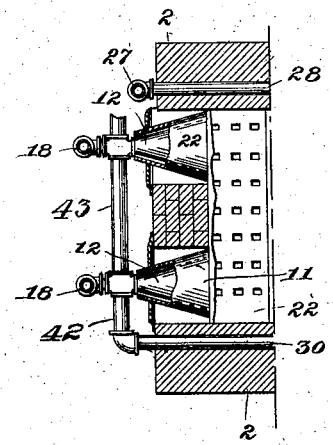

In the drawings, Figure 1 illustrates a vertical longitudinal section on the line 1 1, Fig. 2, of a furnace in which my invention may be carried out. Fig. 2 is a horizontal transverse section thereof on the line 2 2, Fig. 1. Fig. 3 is a vertical transverse section thereof on the line 3 3, Fig. 1. Fig. 4 is a detail side elevation of a furnace modified as to the means supplying gas-releasing heat to the fuel and air to the unignited gases and fuel. Fig. 5 is a similar view of a still further modification to the same for securing the same result by different means. Fig. 6 is a detail plan view of the same, showing means discharging the promoter of combustion into the evolved gases before ignition thereof takes place. Fig. 7 is a perspective view, partly broken away, showing the nozzle, the casing therefor, and the regulator for the air-inlet to the passage between the nozzle and casing. Fig. 8 is a vertical longitudinal sectional view thereof, showing the same in connection with a part of a furnace and the feed-neck of the nozzle. Fig. 9 is a transverse sectional view of the combined valve and measuring device, taken on the line 6 6, Fig. 10; and Fig. 10 is a longitudinal section taken on the line 7 7, Fig. 9.

In carrying out my invention I have illustrated the same in connection with a horizontal boiler-setting; but obviously it may be used and practiced with advantage in connection with upright and inclined boilers, tubular, marine, and other generators, and, in fact, any heating-furnace—as, for example, for metallurgical or other purposes.

In the drawings, 1 indicates an ordinary horizontally-arranged tubular boiler, the furnace-setting of which is of the ordinary construction, comprising the side walls 2, rear end wall 3, front wall 4, and a bridge-wall 5, which latter, together with the front wall of the furnace-setting, support grate-bars 6 of ordinary construction and in the usual manner, the grate-bars being so arranged as to provide below them an ash-pit 7, to which access may be had through an ordinary ash-pit door or doors 8.

Between the front wall 4 at the front of the furnace and the side walls thereof are doors 9 9, closing the outer ends of openings 10 10, which doors are also provided with openings through which project funnel-shaped casings 11 11, providing for nozzles 12 12, surrounding air-spaces to which air is admitted for preventing overheating of the nozzles, a collar or ring $11^a$, turning upon the thread of a tube secured into the outer end of the nozzle, serving to regulate and control the amount of air admitted, thereby providing for admitting only sufficient air to maintain the nozzle from burning without such a supply of air as would tend to objectionably reduce the temperature of the fire-chamber, into which the nozzles are designed to inject a supply of pulverized fuel and fuel-gases. Pulverized fuel, preferably coal, supplied to the nozzles in a state of fine subdivision (the particular degree of fineness of which, however, is unimportant so long as it is light enough to be delivered to the fire-chamber as hereinafter described) is supplied to a hopper 13 or to any other suitable device, from which it falls by gravity into a valve device 14, consisting of a casing 15, in which is journaled a cylinder 16, revolved by a shaft $16^a$ and provided with a series of pockets 17, communicating in turn with the hopper 13 and with a pipe 18, through which the fuel drops by gravity into a curved pipe 19, whence it is conducted to the nozzles. The pockets 17 extend lengthwise to the axis of rotation of the valve, so as to pass transversely and successively across the neck of the hopper and the discharge-port of the casing into the pipe 18, the valve to this end fitting snugly against the sides of the casing, so as to close the ends of the pockets and cut off all communication between the outlet of the hopper and the inlet to the pipe 18, and hence as the series of pockets pass successively under the outlet of the hopper each will receive a charge of fuel, and the series of charges thus formed will be isolated or cut off from each other and also from the outlet to the hopper as soon as the pockets pass beyond said outlet and will successively discharge their contents as they come into register with the inlet of the pipe 18 and discharge therethrough. In order that this feeding of the fuel may be substantially continuous, the pockets 17 are arranged diagonally with reference to the inlet to the pipe 18 and are preferably made tortuous in curved lines, but may be in angles in such a manner and to such a degree that the forward end of one pocket will be substantially as far advanced in the line of rotation as the rear end of the next preceding one, as illustrated in Fig. 10, so that before the preceding pocket shall have fully discharged its contents into the pipe 18 the next succeeding pocket will have commenced its discharge therein. By this arrangement and form of pockets and outlet or port therefor the feeding of the fuel to the furnace will be in the form of a continuous stream, while at the same time direct communication between the main supply of fuel stored above the valve and the inlet to the furnace will be permanently intercepted and the amount being fed into the furnace regulated to a nicety by regulating the speed of rotation of the pocket structure. The fuel as it falls through the pipe 18 into the curved pipe 19 may be driven into the furnace by any suitable means, but preferably by means of a forced current of a gaseous material containing a supporter of combustion and which is dry, and to this end compressed atmospheric air is preferred, which should be dry to a degree which will prevent the fuel from sticking to the walls of any of the passages through which it must pass to the fire-chamber and from coking before its discharge into the fire-chamber. When such gaseous material is employed, the nozzle apparatus is preferably provided with a curved feed-neck 19, (see Fig. 8), but may be angular (see Figs. 1 and 2) or other form, and has formed at the lower side of this neck an inlet 20, through which air, for example, under pressure is injected and forces the fuel descending from the pocket structure or other source of supply inwardly through the nozzle and into the fire-chamber of the furnace. In order that the fuel may not be banked at the point of interception of the connection 20 and the curved neck 19, a supplemental inlet 21 is provided, and this is preferably directed slightly downward toward the inlet 20, which supplemental inlet may be of smaller diameter than the latter, so that the inlet 20 will induce the fuel to come down in front of the inlet 21, the current of which will in turn propel the fuel by its dynamic force into the path of the current passing through the inlet 20 and at the same time induce more or less suction in the fuel-passage above the inlet 20.

The nozzles 12 are preferably made flaring from their outer toward their inner and discharge ends and, as shown in the drawings, are funnel or cone shaped and partly flattened, the flaring or flattening of the nozzles being for the purpose of permitting and causing the released gases to expand and, together with the solid fuel, spread through the fire-chamber in order that the heat resulting from their ignition and combustion may be distributed uniformly throughout the furnace and the surface to be heated and to provide for such a distribution of the solid fuel upon the grate-bar surface as to form an incandescent bed promoting the combustion thereof and of the gases passing over it. The nozzles are also preferably arranged in such a plane as will cause them to discharge their contents, together with the supporter of combustion, in a line substantially with that of the draft of the furnace, which in itself promotes the combustion of the gases and the fuel in suspension by preventing them from coming in contact with the cooling surface of the boiler before they are fully ignited and which at the same time also promotes the uniform distribution of their heat throughout the exposed surface of the boiler and other surfaces to be heated in their passage through and out of the furnace.

In the application of my method to steam-boiler furnaces—such, for example, as is illustrated herein—the nozzles are above the grate-bar surface and the bed of incandescent fuel thereon and slightly below the plane of the bridge-wall, as shown in Fig. 1, and the fire-chamber at its front end is provided with an arch 22, of fire-brick or other suitable material, of a length extending about one-third the length of the grate-bar surface, which arch is honeycomb in form, but may be of any construction providing a series of openings 23 throughout its surface. The purpose of the arch 22, with its perforations 23, is twofold: first, to deflect an intense heat upon the products of combustion immediately they enter the furnace, and, second, to provide for transmitting an intense heat throughout the arch by the passage of products of combustion therethrough and to ignite said products during such passage and before they can otherwise contact with the crown-sheets of the boiler, the radiating direction of the openings 23 in the arch also serving to distribute such ignited products as pass therethrough well toward both sides of the furnace-setting. Furthermore, between the deflected heat of the arch and the reflected heat from the incandescent bed of fuel a zone of heat is formed immediately in front of and next the discharge-orifices of the nozzles which insures a perfect ignition of the gases, the burning of the finer particles of fuel, and the coking of the heavier particles of the fuel. Extending from the arch nearly to the bridge-wall and supported from the grate-bars or other suitable support is a series of vertical partitions 24, arranged at short intervals throughout the width of the fire-box and extending longitudinally of the line of draft of the furnace, so as to constitute the side walls of a plurality of horizontal passages for the flame and products of combustion, said passages being open at the bottom through the grate-bars, but are in greater part closed at the top by a covering of fire-brick or other suitable material 25, which, as shown in Figs. 2 and 3, are supported at short intervals apart on the partitions 24, so as to provide the top of each of said horizontal passages with a multiplicity of transversely-elongated slits or apertures 26, through which the larger portion of the ignited products of combustion pass and impinge directly against the crown-sheet of the boiler. The honeycomb structure formed by the partitions 24 and the fire-brick 25 serve to extend a zone of heat throughout the grate-surface and to the bridge-wall, preventing the escape from the fire-chamber or contact with the crown-sheets of the boiler of any products of combustion which may possibly pass the zone of heat beneath the arch 22 and at the same time protect the crown-sheets from being burned by the intense heat produced throughout the grate-bar surface and in the fire-chamber.

One of the most important if not the essential steps of my invention is the maintaining of the unignited released products of combustion at a high temperature and mixing therewith just before or at the moment of their discharge into an igniting degree of heat in the fire-chamber a supporter of combustion, preferably atmospheric air, and to this end when any supporter of combustion or atmospheric air is employed as a means of forcing the pulverized fuel forward in the fuel-supply pipe 19, as shown in Fig. 8, the pipe 20 is connected with any suitable air-compressor, to which or the discharge-passage therefrom the heat may be applied to a degree raising the temperature of the air to that which will evolve the fuel-gases without igniting them and so thoroughly mix said gases and promoter of combustion that on entering the furnace they will not only fully and thoroughly instantly ignite, but produce a degree of heat burning the finer particles of fuel and coking the heavier particles in suspension. In practice, however, the furnace heat is utilized to heat the promoter of combustion, preferably atmospheric air, in such a manner as not to reduce the temperature of the fire-chamber, and to this end (see Figs. 1 and 2) a pipe 27, at the front end of the furnace, connected with any suitable air-compressor, is coupled to a pipe 28, embedded in one side wall of the fire-chamber to a point just back of the bridge-wall, whence it is projected through the side wall of the furnace into the combustion-chamber and thence extended along the inside thereof to the rear end wall, where it is coupled by pipe 29, extending along said rear wall, to a pipe 30, extending along the inside of the opposite side wall of the combustion-chamber, which pipe 30 just before reaching the rear side of the bridge-wall is projected into and embedded in the other side wall of the fire-chamber and thence projected out the end of said wall and coupled to a pipe 31 in front of the furnace. The pipe 31 is arranged in front of fuel-feed pipes 18 and is connected to the bottom ends thereof by short joints 32 of ordinary construction, so that the air with reference to the front of the furnace is introduced in front of the fuel supplied by the pipes 18 and the fuel thereby forced onwardly into and through the nozzles 12 into the furnace. By the arrangement of the pipes 28, 29, and 30, as shown, the necessary temperature of the air to release the gases from the fuel—that is to say, between 400° and 500° Fahrenheit—is produced without reducing the temperature of the fire-chamber, as would certainly follow the passing of the pipe 28 directly through the fire-chamber, and I am thereby enabled to furnish the supporter of combustion, and particularly air, at the desired degree by means of radiant heat from the walls with maximum economy and without at all reducing the temperature of the fire-chamber.

Instead of employing the supporter of combustion, and particularly atmospheric air, as the sole means of forcing the fuel onward through the pipes 18 and 19 and the nozzles and for furnishing the degree of heat necessary to evolve the gases from the fuel without ignition other means may be employed for forcing the fuel forward and for raising the temperature thereof to a degree evolving the gases thereof without ignition, and as a result the supporter of combustion or atmospheric air may be subsequently mixed with the evolved gases and fuel prior to their ignition and with substantially the same economy. To these ends, as illustrated in Fig. 5, the pipe 18 may be jacketed by a casing 33, connected at its upper and lower ends by pipes 34 and 35 with the breaching 36 of the furnace and the pipes 18 thereby be heated to the degree necessary for releasing the gases in the fuel during their passage through said pipes 18, it being understood that in the practice of my method the combustion is so perfect that such a degree of heat exists in the breaching and may be supplied to the pipe 18. On the other hand, the breaching and the interior of the pipe 18 may be connected by an inclined short pipe 40, in which is an ordinary exhaust-fan (indicated at 41) exhausting the necessary heat from the breaching and discharging said heat downwardly directly into the fuel in the pipe 18 at any point in the passage of the fuel to the discharge-orifices of the nozzles. It is, however, desirable and necessary to the best results that a supporter of combustion, and preferably atmospheric air, at about the same degree of heat required to evolve the gases in the fuel should be mixed with the unignited gases before their discharge into an igniting degree of heat in the fire-chamber, and to this end the heated air in the pipes 28, 29, and 30 may be discharged directly into the nozzles by the pipe 42 (see Fig. 6) and header 43 and the air mixed with the fuel and gases in the nozzles for the first time, and such air may be under sufficient pressure to operate as a suction, tending to draw the unignited released gases and fuel into and force them out of the nozzles and to this extent supplement their gravity or other force, conducting the fuel downwardly through the pipe 18 and into and out the nozzles.

The drawings illustrate the employment of two nozzles at the front of the furnace and the necessary fuel and air connections therewith; but a less or greater number may be used without a departure from the spirit of my invention.

To secure the very best result from the combustion of pulverized fuel and its gases, and which is made possible by my invention, the products of combustion must be conducted through the furnace and over the surface to be heated at a low velocity without regard to the pressure at which said fuel and gases are injected into the fire-chamber, so that all of the products resulting from perfect combustion herein described may be held in the furnace and against the surfaces to be heated the greatest possible length of time consistent with their necessary subsequent discharge therefrom. To this end the breaching 36 of the boiler or the outlet-throat of a furnace connecting a boiler or the furnace, as may be, with its stack should be provided with ordinary pivoted damper, such as is illustrated at 37 in Fig. 1, or other draft-regulating device, whereby the velocity of the draft of the furnace may be perfectly controlled and, if desired, maintained at a very low velocity. Furthermore, by the employment of such a draft-regulator it is entirely practicable to supply heat from the breaching or said furnace-outlet directly to the fuel at the degree evolving the gases therefrom without igniting said gases or the fuel, and in this connection it is proper to add that the means herein provided for supplying air under pressure to the unignited products of combustion also provide a desirable means for blowing out the tubes of the boiler and clearing them of the feathery ash due to perfect combustion deposited therein, and to which end a pipe 38 is connected by a coupling 39 with the air-pipe 29 at the rear end of the furnace for the purpose of securing a hose (not shown) thereto, the heated air under pressure being blown into the tubes in the direction of the draft of the furnace, so that the resulting feathery products may be discharged through the breaching or outlet of a furnace into the stack thereof.

It may be remarked that the temperature of the air for releasing the gases from the pulverized fuel prior to ignition should be below that at which the solid fuel ignites in obtaining the best results, for the reason that otherwise the fuel would be coked and clog the passages and in a short time result in burning the nozzles and that the finer portions and, in fact, a large proportion of the solid fuel discharged into the fire-chamber in the practice of my invention are burned in mid-air, while, on the other hand, the coarser particles are entirely coked in suspension and fall by gravity upon the grate-bars or on the bed of fuel thereon in a perfectly-coked condition, and that when the fuel is finally consumed the residium, which is shale with an entire absence of carbon, will of itself fall by gravity into the ash-pit in the form of sand. In this connection it should also be stated that the difficulty attending the successful use of pulverized fuel in furnaces, and particularly bituminous, (commonly designated as "soft" coal—such, for example, as Illinois and Indiana coal,) may be appreciated in view of the fact that when ground to a maximum coarseness of about thirty mesh, which practice demonstrates to be the best, only about twenty per cent. of it will be thirty mesh, while of the remainder twenty-five per cent. of the mass will be inevitably about fifty mesh fine and the balance from upward of fifty to one hundred and twenty mesh fine, and therefore practically an impalpable powder, the result of this fineness and lightness being that nearly half of the mass will inevitably be carried over the bridge-wall unconsumed in the absence of a continuous regular feed, a low pressure, and a low velocity of feed-draft in the furnace. The necessity of a uniform feed of the fuel to a furnace may also be appreciated in view of the fact that practice demonstrates that when the feed of the fuel and gases to the fire-chamber is irregular the temperature in the fire-chamber is correspondingly irregular and combustion takes place by a series of explosions, so to speak, with the result that unignited gases are unavoidably thereby discharged from the furnace and the solid fuel is piled up against and carried over the bridge-wall by the force thereof. Not only should the feed of the fuel and gases be regular, but the mixture of gas and oxygen should enter the fire-chamber at a low pressure and be maintained at a low velocity during their passage throughout the furnace and over the surface to be heated, when the best results are obtained as to perfect combustion and the successful applying of the heat thereof to the surface to be heated. It should also be noted that the point in the supply-passage at which the gases are released constitutes a gasgenerating chamber, and this at whatever point in the passage or nozzle such release occurs.

Having thus fully described my invention, what I claim as new, and desire to secure by Letters Patent, is—

1. The herein-described method of supplying furnaces with pulverized fuel and promoting the combustion thereof, the same consisting in subjecting said fuel and a supporter of combustion to heat, exterior of the fire-chamber, of a degree releasing the fuel-gases in an unignited condition, said heat being derived from the furnace, and then discharging said gases and supporter of combustion into an igniting degree of heat in the fire-chamber, whereby furnace heat is utilized for releasing said gases, without any reduction in the heat of the fire-chamber, and the gases are subsequently subjected to ignition in the presence of a maximum degree of heat on entering the fire-chamber, substantially as described.

2. The herein-described method of supplying furnaces with pulverized fuel and promoting the combustion thereof, the same consisting in subjecting said fuel and a supporter of combustion to heat, exterior of the fire-chamber, of a degree releasing the fuel-gases in an unignited condition, said heat being derived from the furnace, and then discharging said gases, fuel and supporter of combustion in the presence of each other into an igniting degree of heat in the fire-chamber, whereby furnace heat is utilized for releasing said gases, without any reduction in the heat of the fire-chamber, and the gases and solid fuel are subjected to ignition in such a volume, in the presence of a supporter of combustion, and to such a high degree of igniting heat on entering the fire-chamber as to completely burn the finer and coke the coarser particles of the fuel, substantially as described.

3. The herein-described method of supplying furnaces with pulverized fuel and promoting the combustion thereof, the same consisting in first subjecting said fuel to oxygen or air, under a low pressure and at a temperature releasing the fuel-gases, then expanding the same prior to ignition, and finally discharging said gases and fuel into an igniting degree of heat in the fire-chamber of the furnace, in an expanded and spread-out condition, substantially as described.

4. The herein-described method of supplying furnaces with pulverized fuel and promoting the combustion thereof, the same consisting in first subjecting said fuel to oxygen or air at a temperature releasing the fuel-gases and at a pressure mixing the gases and fuel, then expanding the same prior to ignition, and finally discharging said gases and fuel into an igniting degree of heat in the fire-chamber of a furnace in a commingled, expanded, and spread-out condition, substantially as described.

5. The herein-described method of supplying furnaces with pulverized fuel and promoting the combustion thereof, the same consisting in subjecting said fuel to oxygen or air at a temperature releasing the gases therefrom, then expanding the same prior to ignition, and finally discharging said gases and fuel into a degree of heat in the fire-chamber igniting the gases, consuming the finer portions of the fuel, and coking the remainder of the fuel while in suspension above the grate-bars, substantially as described.

6. The herein-described method of supplying furnaces with pulverized fuel and promoting the combustion thereof, the same consisting in first subjecting the said fuel to oxygen or air, under a low pressure and at a temperature releasing the fuel-gases, without igniting the gases or fuel, then discharging the same at a low velocity into the fire-chamber in a degree of heat igniting and burning the gases and finer fuel, whereby the coarser fuel is coked and falls by gravity upon the grate-bars, substantially as described.

7. The herein-described method of supplying furnaces with pulverized fuel and promoting the combustion thereof, the same consisting in first subjecting said fuel to oxygen or air under a low pressure and at a temperature releasing the fuel-gases, without igniting the gas or fuel, then expanding the same before ignition, and finally discharging the fuel and gases into an igniting degree of heat in the fire-chamber at a low velocity and in an expanding condition, whereby the ignited gases are diffused throughout the fire-chamber and the furnace structure, and the solid fuel is coked and falls by gravity in a spread-out condition throughout the area of the grate-bar surface, substantially as described.

8. The herein-described method of supplying furnaces with pulverized fuel and promoting the combustion thereof, the same consisting in first subjecting said fuel to oxygen or air, under a low pressure and at a temperature releasing the fuel-gases, without igniting the gases or fuel, then expanding said gases and fuel, and discharging the same at a low velocity in a line substantially with that of the draft of the furnace into an igniting degree of heat, substantially as described.

9. The herein-described method of supplying furnaces with pulverized fuel and promoting the combustion thereof, the same consisting in first subjecting said fuel to oxygen or air, under a low pressure and at a temperature releasing the fuel-gases, without igniting said gases or fuel, then discharging said gases and fuel into an igniting degree of heat in the fire-chamber and at a low velocity permitting coked fuel to fall by gravity upon the grate-bars, and maintaining the ignited products in contact with the surface or surfaces to be heated for the greatest possible length of time consistent with their necessary subsequent discharge from the furnace, substantially as described.

10. The herein-described method of supplying furnaces with pulverized fuel and promoting the combustion thereof, the same consisting in first supplying said fuel uniformly continuous to a generating-chamber, then subjecting said fuel to oxygen or air uniformly continuous and at a low pressure to a degree of heat releasing the fuel-gases, and then discharging said gases and fuel into an igniting degree of heat in the fire-chamber at a low pressure, permitting the unconsumed solid fuel to fall by gravity upon the grate-bars, substantially as described.

11. The herein-described method of supplying furnaces with pulverized fuel and promoting the combustion thereof, the same consisting in first supplying said fuel to a generating-chamber, then subjecting said fuel to oxygen or air uniformly continuous and at a low pressure at a degree of heat releasing the fuel-gases, and then discharging said gases and fuel into an igniting degree of heat in the fire-chamber at a low pressure, in a spread-out condition over the grate-surface thereof and in a line substantially with that of the draft of the furnace, substantially as described.

W. W. WEAVER.

Witnesses:
JNO. G. ELLIOTT,
EDGAR T. BRANDENBURG.